United States Patent [19]

DeNicola, Jr. et al.

[11] Patent Number: 5,286,791
[45] Date of Patent: Feb. 15, 1994

[54] IMPACT MODIFIED GRAFT COPOLYMER COMPOSITIONS CONTAINING BROAD MOLECULAR WEIGHT DISTRIBUTION POLYPROPYLENE

[75] Inventors: Anthony J. DeNicola, Jr.; Michael R. Conboy, both of New Castle County, Del.

[73] Assignee: Himont Incorporated, Wilmington, Del.

[21] Appl. No.: 891,374

[22] Filed: May 29, 1992

[51] Int. Cl.$^5$ .................. C08G 63/48; C08G 63/91
[52] U.S. Cl. ......................... 525/71; 525/70; 525/80; 525/88; 525/98; 524/451; 524/425; 524/492
[58] Field of Search ............... 525/70, 71, 80, 88, 525/98

[56] References Cited

U.S. PATENT DOCUMENTS 3,314,904  4/1967  Burkus ........................... 260/4
4,386,187  5/1983  Grancio et al. ................. 525/96
4,957,974  9/1990  Ilenda et al. ................... 525/301
4,990,558  2/1991  DeNicola, Jr. et al. ......... 524/504

OTHER PUBLICATIONS

Copending U.S. Ser. No. 07/860,864 filed Mar. 31, 1992.

Primary Examiner—James J. Seidleck
Assistant Examiner—Mary Critharis

[57] ABSTRACT

Disclosed are impact modified graft copolymer compositions comprising (A) from 10 to 90% of a graft copolymer of a propylene polymer material having graft polymerized thereto one or more vinyl monomer(s), (B) from 90 to 10% of at least one broad molecular weight distribution propylene polymer material, and (C) from 2 to 40% of at least one rubber component, wherein (A)+(B)+(C) is 100%, and filled compositions thereof. The compositions are useful as stand-alone structural materials.

13 Claims, No Drawings

IMPACT MODIFIED GRAFT COPOLYMER COMPOSITIONS CONTAINING BROAD MOLECULAR WEIGHT DISTRIBUTION POLYPROPYLENE

FIELD OF THE INVENTION

The present invention relates to compositions comprising a graft copolymer, a propylene polymer material, and a rubber component, to filled compositions thereof and in particular, to an impact modified graft copolymer composition comprising a graft copolymer of propylene polymer material, at least one broad molecular weight distribution propylene polymer material and at least one rubber component and to filled compositions thereof.

BACKGROUND OF THE INVENTION

Graft copolymers formed by polymerizing monomers at active grafting sites on a polymer backbone constitute an interesting class of polymer hybrids because, although a single chemical species, they nevertheless are capable of displaying properties characteristic of the graft polymer as well as of the backbone polymer, rather than a simple averaging of the properties of the component polymers. When compared to physical blends of polymers, graft copolymers, owing to the intersegment chemical bonds therein, usually exhibit a finer heterophasic morphology in which the domain size of the dispersed phase is stable and may be smaller by about an order of magnitude. Moreover, the adhesion between phases is better. Physical blends of immiscible polymers, e.g., polypropylene and polystyrene, require the inclusion of a compatibilizer, e.g , a block copolymer suitably chosen, which can alleviate to some degree the problem associated with the high interfacial tension and poor adhesion between the immiscible polymers in the blend. Physical blends of polypropylene and polystyrene containing minor amounts of a styrenic block copolymer rubber as a compatibilizer for the polymers in the blend are described in U.S. Pat. No. 4,386,187.

Structural plastics based on a "chemical" blend of propylene and polymerizable monomer(s), i.e., based on a graft copolymer of a polymerizable monomer(s) on a backbone of propylene polymer material, would fill a need in the art because of the benefits accruing from the fine domain structure in the graft copolymers and also because the necessary adhesion between the propylene polymer and polymerizable monomer phases would derive from the chemical bonds in the graft copolymer per se rather than depend on the action of an external agent, i.e., a compatibilizer. However, until now, the uses suggested for these graft copolymers have been limited chiefly to compatibilizers for immiscible polymer systems and components of gum plastic compositions.

U.S. Pat. No. 3,314,904 describes forming a "gum plastic" by making a graft copolymer of styrene on polyethylene or polypropylene, and, in particular, a graft interpolymer of styrene, acrylonitrile, and polyethylene or polypropylene, and blending the graft copolymer with certain selected compatible rubbery materials. The grafted styrene or styrene-acrylonitrile content of the graft copolymer is 75-95%, preferably 85-95%, and more preferably 90-95%. Hence the graft copolymer is predominantly bound styrene or bound styrene-acrylonitrile, and in the copolymers made from polypropylene the polypropylene is only a minor component and present as a dispersed phase. Thus the properties of the bound styrene or styrene-acrylonitrile predominate. The graft copolymer is made by subjecting the polyolefin to high-energy ionizing radiation, and then contacting the irradiated polyolefin with styrene or with styrene and acrylonitrile.

However, for use as stand-alone structural plastics having the desirable properties of propylene polymers, e.g., excellent chemical resistance, good moisture resistance, etc., graft copolymers of a polymerizable monomer(s) on a backbone of a propylene polymer material must exhibit a heterophasic morphology in which the propylene polymer is the continuous phase. This requires that the polymerizable monomer(s) content of the graft copolymer not exceed about 65 percent by weight, while, at the same time, being high enough to improve the stiffness of the propylene polymer to the required degree.

The advantages of graft copolymers of a polymerizable monomer(s) on a propylene polymer backbone over physical blends of the polymers as stand-alone structural plastics could be better utilized if a means were found for imparting a better balance of properties to the graft copolymers.

Various compositions have been obtained in an attempt to achieve a better balance of properties. For example, U.S. Pat. No. 4,990,558 discloses a graft copolymer based rigid thermoplastic composition of (a) from 60 to 95%, by weight, a graft copolymer of a styrenic polymer grafted onto a propylene polymer material backbone and (b) from 5 to 40%, by weight, of a rubber component comprising (i) from 20 to 100%, by weight, of (i) at least one monoalkenyl aromatic hydrocarbon-conjugated diene block copolymer, (ii) at least one block copolymer which is a hydrogenated copolymer of (i), or (iii) a mixture of at least one (i) with at least one (ii); and (2) 0 to 80%, by weight, of an olefin copolymer rubber, i.e. EPM or EPDM. U.S. Pat. No. 4,957,974 discloses blends which exhibits improved melt strength comprising a polyolefin and a graft copolymer consisting of a non-polar polyolefin trunk and at least 80% of a monomer of a methacrylic ester and less than 20% of an acrylic or styrenic monomer wherein from 0.2 to 10% of the total formulation (polyolefin plus graft copolymer) is a chemically grafted acrylic polymer or copolymer. In U.S. Ser. No. 07/860,864, pending filed Mar. 31, 1992, there is disclosed thermoplastic compositions comprising (a) a propylene polymer material grafted with polymerizable monomer(s) of a rigid polymer(s) having a Tg greater than 80° C., (b) a propylene polymer material grafted with a polymerizable monomer(s) of a soft polymer(s) having a Tg of less than 20° C., and optionally (c) at least one other rubber modifier.

However, while a better balance of properties is obtained there is still a trade off between stiffness and impact. In other words, as the impact increases the modulus decreases.

Thus, impact modified graft copolymer blends or compositions having improved impact/stiffness balance without a substantial loss in modulus is desired.

SUMMARY OF THE INVENTION

It has been found that the impact/stiffness balance of impact modified graft copolymer compositions can be improved, without a substantial loss of modulus, by incorporating into said compositions at least one broad molecular weight distribution propylene polymer material. The compositions obtained have improved impact/stiffness balance, without a substantial loss in modulus, while retaining a balance of other properties, as compared to the properties of graft copolymers alone or blended with modified or unmodified rubber, and optionally conventional polypropylene.

The present invention provides an impact modified graft copolymer composition comprising, by weight: (A) from 10 to 90% of a graft copolymer of propylene polymer material having graft polymerized thereto one or more vinyl monomer(s), (B) from 90 to 10% of at least one broad molecular weight distribution propylene polymer material, and (C) from 2 to 40% of at least one rubber component, wherein (A)+(B)+(C) are 100%.

In another embodiment of this invention there is provided a filled composition having improved flexural modulus, notched Izod impact and plate impact properties comprising the above composition filled with particulate mineral fillers, namely with particulate talc, calcium carbonate and silicate fillers and mixtures thereof, optionally coated with an organic compound.

While it is known that talc, calcium carbonate and silicate will stiffen plastic materials to some extent it is usually at the expense of impact resistance and elongation or ductility. In the filled compositions of this invention from about 10 to about 100 parts of a talc, calcium carbonate or silicate filler or mixtures thereof, optionally coated with an organic compound, per hundred parts (pph) of the composition, said filler having a mean particle size from 0.5 to 4.0 microns, when admixed with said composition of this invention, provides filled compositions having an overall better balance of properties and improved impact strength and modulus values. These tough and rigid filled compositions are particularly useful as a material in the manufacture of appliance housings, automotive components and in other applications where polymer materials have or could replace steel and aluminum.

The compositions or filled compositions or both of this invention can be used in injection molding, profile extrusion and melt or solid phase thermoforming processes.

DETAILED DESCRIPTION OF THE INVENTION

Unless otherwise specified all percentages and parts are by weight in this specification.

The graft copolymer of component (A) is a propylene polymer material backbone having graft polymerized thereto one or more vinyl monomer. The propylene polymer material which forms the backbone or substrate of the graft copolymer is (i) a homopolymer of propylene; (ii) a random copolymer of propylene and an olefin selected from the group consisting of ethylene and $C_4$-$C_{10}$ alpha-olefins, provided that, when the olefin is ethylene, the maximum polymerized ethylene content is about 10%, preferably about 4%, and when the olefin is a $C_4$-$C_{10}$ alpha-olefin, the maximum polymerized content thereof is about 20%, preferably about 16%; or (iii) a random terpolymer of propylene and an olefin selected from the group consisting of ethylene and $C_4$-$C_8$ alpha-olefins, provided that the maximum polymerized $C_4$-$C_8$ alpha-olefin content is about 20%, preferably about 16%, and, when ethylene is one of the olefins, the maximum polymerized ethylene content is about 5%, preferably about 4%, with a maximum co-monomer content of 25%.

The $C_4$-$C_{10}$ alpha-olefins include linear and branched $C_4$-$C_{10}$ 1-olefins such as, for example, 1-butene, 1-pentene, 3-methyl-1-butene, 4-methyl-1-pentene, 1-hexane, 3,4-dimethyl-1-butene, 1-heptene, 3-methyl-1-hexene, and the like.

Polypropylene and ethylene-propylene random copolymer are preferred propylene polymer material backbones.

Suitable vinyl monomer or monomers to be graft polymerized onto the propylene polymer material backbone include styrene, styrene derivatives, methyl acrylate, ethyl acrylate, methyl methacrylate, cyclohexyl methacrylate, phenyl methacrylate, benzyl methacrylate, o-methoxyphenyl methacrylate, acrylonitrile, methacrylonitrile, acrylic acid methacrylic acid and mixtures thereof.

Preferred are styrene, methyl methacrylate, styrene/methyl methacrylate, styrene/acrylonitrile, and styrene/methyl methacrylate/acrylonitrile.

From 10 to 90%, and preferably from 10 to 75%, of the composition is comprised of the graft copolymer of component (A).

Component (B) is a propylene polymer material having a broad molecular weight distribution, Mw/Mn, of from 8 to 60, preferably from 12 to 40, a melt flow rate of from 0.5 to 50, preferably from 3 to 30, and a xylene insolubles at 25° C. of greater than or equal to 94, and preferably greater than or equal to 96%, most preferably greater than or equal to 98%.

Said propylene polymer material having a broad molecular weight distribution can be a homopolymer of propylene or an ethylene-propylene rubber impact modified homopolymer of propylene, wherein the propylene homopolymer has a broad molecular weight distribution.

The broad molecular weight distribution propylene polymer material described above and used in the present invention, can be prepared by sequential polymerization in at least two stages, in the presence of Ziegler-Natta catalyst supported on magnesium halides, in active form.

Preferably, said catalyst contain, as an essential element, a solid catalyst component (a) comprising a titanium compound having at least one titanium-halogen bond, and an electron donor compound both supported on a magnesium halide in active form, and are characterized in that they are capable of producing propylene polymers having a xylene insolubles fraction at 25° C. greater than or equal 94%, preferably greater than or equal to 96%, and have a sensitivity to molecular weight regulators high enough to produce propylene homopolymer having a MFR of less than or equal to 0.5 and greater than or equal to 50 g/10 min.

The catalysts used are obtained by contacting:
 (a) the above mentioned solid catalyst component;
 (b) an Al-Alkyl compound;
 (c) an external electron-donor compound.

Solid catalyst components (a) having the above mentioned characteristics are well known in patent literature.

Particularly suited are the solid catalyst components used in the catalysts described in U.S. Pat. No. 4,339,054, and European patent n. 45,977. Other examples are set forth in U.S. Pat. No. 4,472,524.

In general, the solid catalyst components used in said catalysts comprise, as electron-donor compounds, compounds selected from the ethers, ketones, lactones, compounds containing N, P, and/or S atoms, and esters of mono- and dicarboxylic acids.

Particularly suited are the esters of phthalic acid, such as diisobutyl, dioctyl and diphenyl phthalate, and benzylbutyl phthalate; the esters of malonic acid such as diisobutyl and diethyl malonate; the alkyl and aryl pivalates, the alkyl, cycloalkyl and aryl maleates, alkyl and aryl carbonates such as diisobutyl carbonate, ethyl phenyl carbonate, and diphenyl carbonate; the esters of succinic acid such as mono and diethyl succinate.

The preparation of the above mentioned catalysts is carried out according to various methods.

For example, the magnesium halide (anhydrous, i.e., containing less than 1% of water), the titanium compound, and the electron-donor compound can be milled under conditions where the magnesium halide is active. The milled product is then treated one or more times with an excess of $TiCl_4$ at temperatures from 80° to 135° C., after which it is washed repeatedly with a hydrocarbon, such as hexane, until all the chlorine ions have disappeared.

According to another method, the anhydrous magnesium halide is preactivated according to known methods, and then caused to react with an excess of $TiCl_4$ containing the electron-donor compound in solution. Here again, the treatment takes place at temperatures ranging from 80° C. to 135° C. Optionally, the treatment with $TiCl_4$ is repeated, and the solid washed with hexane, or another hydrocarbon solvent, in order to eliminate all traces of nonreacted $TiCl_4$.

According to another method, a $MgCl_2 \cdot nROH$ adduct (in particular under the form of spheroidal particles), where n is generally comprise from 1 and 3, and ROH is ethanol, butanol, or isobutanol, is reacted with an excess of $TiCl_4$ containing the electron-donor compound in solution. The temperature generally ranges from 80° C. to 120° C. The solid is then isolated and reacted once more with the $TiCl_4$, after which it is separated and washed with a hydrocarbon until all chlorine ions have disappeared.

According to another method, magnesium alcoholates and chloroalcoholates (particularly the chloroalcoholates prepared according to the method described in U.S. Pat. No. 4,220,554) are reacted with an excess of $TiCl_4$ containing the electron-donor compound in solution, carried out according to the reaction conditions described above.

In the solid catalyst component (a), the titanium compound expressed as Ti is generally present in a percentage ranging from 0.5 to 10% by weight. The quantity of electron-donor compound which remains fixed on the solid component (internal donor), generally ranges from 5 to 20% in moles with respect to the magnesium dihalide.

The titanium compounds which can be used for the preparation of the solid catalyst component (a) are the halides and the halogen alcoholates. Titanium tetrachloride is the preferred compound.

Satisfactory results can be obtained also with titanium trihalides, particularly $TiCl_3OR$ where R is a phenyl radical.

The reactions indicated above bring about the formation of magnesium halide in active form. Besides these reactions, other reactions are known in the literature which cause the formation of activated magnesium halide starting from magnesium compounds different from the halides, such as carboxylates of magnesium, for example.

The active form of the magnesium halides in the catalyst components (a) can be recognized by the fact that in the X-ray spectrum of the catalyst component the major intensity reflection, which appears on the spectrum of the nonactivated magnesium chloride (having a surface area smaller than 3 $m^2/g$), is no longer present, but in its place there is a halo with the maximum intensity shifted with respect to the position of the major intensity reflection of the nonactivated magnesium dihalide, or by the fact that the major intensity reflection shows a width at half-height at least 30% greater than the one of the major intensity reflection which appears in the nonactivated Mg chloride spectrum.

The most active forms are those where the above mentioned halo appears in the X-ray spectrum of the component.

Among the magnesium halides, the chloride is the preferred compound. In the case of the most active forms of magnesium chloride, the X-ray spectrum of the catalyst component shows a halo instead of the reflection which in the spectrum of the nonactivated chloride appears at a distance of 2.56 Å.

The Al-alkyl compounds (b) used as co-catalysts comprise the Al-trialkyls, such as Al-triethyl, Al-isobutyl, Al-tri-n-butyl, and linear or cyclic Al-alkyl compounds containing two or more Al atoms through O or N atoms, or $SO_4$ and $SO_3$ groups.

Examples of these compounds are:

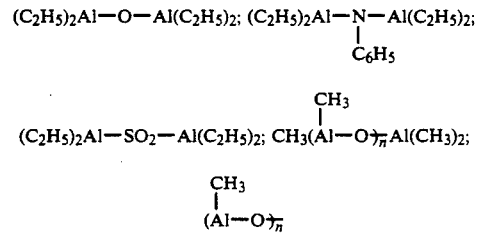

where n is a number from 1 to 20.

The Al-alkyl compound is generally used in such quantities that the Al/Ti ratio ranges from 1 to 1000.

In addition to the solid catalyst component (a) and the Al-alkyl compound (b), the catalysts contain an external electron-donor compound (c) (i.e., an electron-donor added to the Al-alkyl compound). Said external electron-donor compound is selected from silanes capable of conferring to the catalyst the above mentioned levels of stereospecificity (determined by the high content of fraction insoluble in xylene at 25° C.) and sensitivity to the molecular weight regulator.

Suitable for this purpose are the silanes containing at least one cyclopentyl group bonded to the silicon, and one or more —OR groups also bonded to the silicon atom, where R is a $C_1-C_{18}$ alkyl, $C_3-C_{18}$ cycloalkyl, $C_6-C_{18}$ aryl, or $C_7-C_{18}$ aralkyl radical. Preferably R is methyl or ethyl. Particularly suited is the dicyclopentyldimethoxysilane (DCPMS). The above mentioned external donors are generally used in quantities ranging from 0.001 to 15 moles, preferably from 1 to 10 moles with respect to the moles of Al-alkyl compound (b).

The sequential polymerization carried out in the presence of the above catalysts, where the polymerization occurs in at least two stages, preparing fraction (A) and (B) in separate and consecutive stages, and operating in each stage in the presence of the polymer and the catalyst coming from the preceding stage.

The polymerization process can be carried out in batch or in continuous, according to known techniques, operating in liquid phase in the presence or not of an inert diluent, or in gas phase, or liquid-gas phase, preferably in gas phase.

The polymerization reaction times and temperatures are not critical, however, it is preferred that the polymerization is carried out at a temperature of from 20° C. to 100° C.

As previously stated the regulation of the molecular weight is controlled using known regulators, particularly hydrogen.

The catalysts can be precontacted with small quantities of olefins (prepolymerization). Prepolymerization improves both catalyst activity and polymers' morphology.

The prepolymerization is carried out maintaining the catalyst in suspension in a hydrocarbon solid (hexane or heptane, for example), and the polymerization temperature is between ambient temperature and 60° C. for a period of time which is sufficient to produce a quantity of polymer ranging from 0.5 to 3 times the weight of the solid component. It can also be carried out in liquid propylene under the above indicated temperature conditions, and producing quantities of polymer that can reach 1000 g per g of catalyst component.

Component (B) is present in the amount of from 90 to 10%, and preferably from 20 to 75% of the total composition.

The rubber component (C) used in the composition of the present invention can be (i) one or more olefin rubbers containing two or more monomers selected from ethylene, propylene or butene, and optionally a non-conjugated diene; (ii) one or more monoalkenyl aromatic hydrocarbon-conjugated diene block copolymer or hydrogenated products thereof; (iii) a graft copolymer of propylene polymer material grafted with a polymerizable monomer or monomers which when polymerize form rubbery polymer(s) having a Tg less than 20° C.; (iv) butyl rubber; (v) isoprene rubber; (vi) random copolymer of styrene-butadiene rubber or acrylonitrile-butadiene rubber; or (vii) mixtures thereof.

Suitable examples of the olefin rubber are ethylene-propylene copolymer rubber (EPR) having an ethylene content of from 30 to 70%, ethylene-butene-1 copolymer rubber (EPR) having an ethylene content of from 30 to 70%, propylenebutene-1 copolymer rubber (PBR) having a butene-1 content of from 30 to 70%, ethylene propylene non-conjugated diene monomer rubber (EPDM) having an ethylene content of 30 to 70% and a diene content of from 1 to 10 %, ethylene-propylene-butene-1 terpolymer rubber having a propylene content of from 1 to 10% and a butene-1 content of from 30 to 70% or a propylene content of from 30 to 70% and a butene-1 content of from 1 to 10%.

Examples of the non-conjugated dienes include 1,4-hexadiene, ethylidene-norbornene and dicyclopentadiene.

Ethylene-propylene copolymer rubber is the preferred olefin rubber.

The monoalkenyl aromatic hydrocarbon-conjugated diene block copolymer is a thermoplastic elastomer of the A—B (or diblock) structure, the linear A—B—A (or triblock) structure, the radial (A—B)$_n$ type where n=3-20, hydrogenated products thereof or a combination of these structure types, wherein A block is a monoalkenyl aromatic hydrocarbon polymer block and B is a conjugated diene polymer block. Various grades of copolymers of this type are commercially available. The grades differ in structure, molecular weight of mid and end blocks, and ratio of monoalkenyl aromatic hydrocarbon to rubber. In mixtures of two or more block copolymers (one or more of which may be hydrogenated), the structure types may be the same or different.

Typical monoalkenyl aromatic hydrocarbon monomers are styrene, ring-substituted $C_{1-4}$ linear or branched alkyl styrenes, and vinyl toluene. Styrene is preferred. Suitable conjugated dienes are butadiene and isoprene.

The average molecular weight of the block copolymer generally will be in the range of about from 45,000 to 260,000 g/mole, average molecular weights in the range of about from 50,000 to 125,000 g/mole being preferred.

The propylene polymer material grafted with a polymerizable monomer(s) which when polymerize form a rubbery polymer(s) having a Tg less than 20° C. can be the same propylene polymer material as defined for the graft copolymer of component (A). Examples of such polymerizable monomer(s) are butyl acrylate, ethylhexyl acrylate, butyl acrylate/butyl methacrylate, butyl acrylate/ethylhexyl acrylate and ethylhexyl acrylate/butyl methacrylate. Preferred is butyl acrylate and butyl acrylate/butyl methacrylate.

The rubber component is present in an amount of from 2 to 40%, and preferably from 5 to 25%.

The graft copolymer of component (A) and (C) of the present composition can be made according to any one of various methods. One of these methods involves forming active grafting sites on the propylene polymer material either in the presence of the grafting monomer, or followed by treatment with the monomer. The grafting sites may be produced by treatment with a peroxide or other chemical compound which is a free-radical polymerization initiator, or by irradiation with high-energy ionizing radiation. The free radicals produced in the polymer as a result of the chemical or irradiation treatment form the active grafting sites on the polymer and initiate the polymerization of the monomer at these sites. Graft copolymers produced by the peroxide initiated grafting method are preferred.

In a peroxide initiated method, the propylene polymer material is treated at a temperature of about from 60° to 125° C., preferably about from 80° to 120° C., with about from 0.1 to 6, preferably about from 0.2 to 3.0, pph (parts by weight per 100 parts by weight of the propylene polymer material) of an initiator having a decomposition half-life of about from 1 to 240, preferably about from 5 to 100, and more preferably about from 10 to 40, minutes at the temperature employed. Organic peroxides, and especially those which generate alkoxy radicals, constitute the preferred class of initiators. These include acyl peroxides, such as benzoyl and dibenzoyl peroxides; dialkyl and aralkyl peroxides, such as di-tert-butyl peroxide, dicumyl peroxide, cumyl butyl peroxide,1,1-di-tert-butylperoxy-3,5,5-trimethylcyclohexane, 2,5-dimethyl-2,5-di-tert-butylperoxyhexane, and bis(alpha-tert-butyl peroxyisopropylbenzene); peroxy esters, such as tert-butylperoxypivalate, tert-butyl perbenzoate, 2,5-dimethyl- hexyl 2,5-di(perbenzoate), tert-butyl di(perphthalate), tert-butylperoxy-2-ethyl hexanoate, and 1,1-dimethyl-3-hydroxybutylperoxy-2- ethyl hexanoate; and peroxy carbonates, such as di(2-ethylhexyl)peroxy dicarbonate, di(n-propyl)peroxy dicarbonate, and di(4-tert-butyl-cyclohexyl)peroxy dicarbonate.

Over a time period which coincides with, or follows, the period of initiator treatment, with or without overlap, the propylene polymer material is treated with about from 10 to 70 percent by weight of the grafting monomer(s), based on the total weight of propylene polymer material and grafting monomer(s) used, at a rate of addition which does not exceed about 4.5, preferably does not exceed about 4.0, and more preferably does not exceed about 3.0, pph per minute at any monomer addition level. If the monomer is added after the initiator addition period, preferably no more than about 2.5 initiator half-lives separate the initiator and monomer addition periods.

After the grafting period, any unreacted monomer is removed from the resultant grafted propylene polymer material, and any unreacted initiator is decomposed and any residual free radicals are deactivated, preferably by heating, generally at a temperature of at least about 110° C. for at least about 5 minutes, preferably at least about 120° C. for at least about 20 minutes. A substantially non-oxidizing environment is maintained throughout the process.

The expression "substantially non-oxidizing", when used herein to describe the environment or atmosphere to which the propylene polymer material is exposed, means an environment in which the active-oxygen concentration, i.e., the concentration of oxygen in a form that will react with the free radicals in the polymer material, is less than about 15%, preferably less than 5%, and most preferably less than about 1%, by volume. The most preferred concentration of active oxygen is 0.004% or lower by volume. Within these limits, the non-oxidizing atmosphere can be any gas, or mixture of gases, which is oxidatively inert toward the free radicals in the propylene polymer material, e.g., nitrogen, argon, helium, and carbon dioxide.

In a method wherein the active grafting sites are produced by irradiation, the propylene polymer material is irradiated at a temperature in the range of about from 10° to 85° C. with high-energy ionizing radiation, and the irradiated polymer material is treated, at a temperature of about from 10° to 100° C., preferably about from 10° to 70° C., and more preferably about from 10° to 50° C., for at least about 3 minutes, preferably at least about 10 minutes in a semi-batch process and preferably about 30–60 minutes in a continuous process, with about from 10 to 70 percent by weight of the grafting monomer(s), based on the total weight of propylene polymer material and grafting monomer(s) used. Thereafter, simultaneously or successively in optional order, substantially all residual free radicals in the resultant grafted propylene polymer material are deactivated, and any unreacted monomer is removed from the material. The propylene polymer material is maintained in a substantially non-oxidizing environment, e.g., under inert gas, throughout the process at least until after the deactivation of residual free radicals has been completed. The deactivation of free radicals preferably is accomplished by heating, e.g., at temperatures of at least about 110° C., preferably at least about 120° C., generally for at least about 20 minutes.

Suitable particulate forms of the grafted propylene polymer material include powder, flake, granulate, spherical, cubic and the like. Spherical particulate forms prepared from a propylene polymer material having a pore volume fraction of at least about 0.07 are preferred.

Most preferred, for use in the present composition, is a graft copolymer in the form of uniformly grafted particles obtained from propylene polymer particles having (a) a pore volume fraction of at least about 0.07, wherein more than 40% of the pores have a diameter larger than 1 micron; (b) a surface area of at least 0.1 $m^2/g$; and (c) a weight average diameter in the range of about from 0.4 to 7 mm. Such propylene polymer material is commercially available from HIMONT Italia S.r.l.

In the filled compositions of this inventions, the talc, calcium carbonate, silicate filler or mixtures thereof are preferably present in an amount from 25 to 70 pph of the composition of this invention. The mean particle size of such talc, calcium carbonate or silicate fillers is preferably from 0.5 to 2 microns and most preferably from 0.5 to 1.5 microns.

Any organic compound which, when coated on the filler particle in an amount sufficient to provide a thin coating of substantially completely all of the surface area of the filler particle, reduces the adhesion of that particle to the polymer matrix in which the coated filler particle is admixed, can be used to coat the filler particles useful in the practice of this invention such as, saturated and unsaturated fatty acids and Group 1a and 2a metal salts thereof having from 10 to 32 carbon atoms in the alkyl or alkylene moiety bonded to the carboxylic acid or carboxylic acid salt radical. Typical fatty acids include lauric, myristic, palmitic, stearic, nondecylic, hyenic, melissic, hypogeic, oleic, linoleic and linolinic. Salts of such fatty acids include calcium, sodium and potassium.

Other fillers and reinforcing agents, e.g., carbon black and glass fibers, as well as inorganic powders such as other calcium carbonates and talcs (i.e., other than those set forth herein above for the filled compositions of this invention), mica, and glass, may be included in the compositions of the invention at concentration levels up to about 80 parts by weight per 100 parts by weight of A+B+C The components of the composition can be blended or admixed in any conventional mixing apparatus, such as an extruder or a Banbury mixer.

The present invention will be illustrated in greater detail with reference to the examples of the invention set forth below.

The physical properties set forth in the Tables were measured by the following methods:

| | |
|---|---|
| Flexural Modulus | ASTM D-790 and D-618, Procedure A (0.5 in/min. crosshead speed and center section of a molded T-bar) |
| Flexural Strength | ASTM D-638, Procedure A (center section of a molded T-bar) |
| Notched Izod | ASTM D-256-87 |
| Melt Flow Rate (MFR) | ASTM D-1238, Condition L |
| Porosity | Determined by a mercury porosimetry technique in which the volume of mercury absorbed by the particles is measured, wherein the volume of mercury absorbed corresponds to the volume of the pores. |
| Xylene solubles @ 25° C. | Determined by dissolving 2 g of polymer in 200 ml of xylene at 135° C., cooling in a constant temperature bath to 22° C. and |

-continued

| | |
|---|---|
| | filtering through fast filter paper. An aliquot of the filtrate was evaporated to dryness, the residue weighed and the weight % soluble fraction calculated. |
| Molecular weight distribution (Mw/Mn) | Determined by Waters 150-C ALC/GPC, in trichlorobenzene at 145° C. with a differential refractive index detector |
| [η] intrinsic viscosity | Determined in tetrahydronaphthalene at 135° C. |

The propylene polymer materials having a broad molecular weight distribution used in the examples set forth below were prepared according to the following general procedure.

Preparation of the Catalyst

Into a reactor equipped with agitator, in inert atmosphere, is introduced, 28.4 g of $MgCl_2$, 49.5 g of anhydrous ethanol, 100 ml of ROL OB/30 vaseline oil, 100 ml of silicon oil having a viscosity of 350 cs, and the content is heated to 120° C. until the $MgCl_2$ is dissolved. The hot reaction mixture is then transferred to a reactor containing 150 ml of vaseline oil and 150 ml of silicon oil, and equipped with an Ultra Turrax T-45 agitator. The temperature is maintained at 120° C. while the mixture is stirred for 3 minutes at 3000 rpm. The mixture is then discharged into a reactor equipped with an agitator and containing 1000 ml of anhydrous n-heptane and cooled to 0° C. The particles obtained are recovered by filtration, washed with 500 ml of n-hexane, and gradually heated to 180° C. in nitrogen flow, thus obtaining a decrease in alcohol content from 3 moles to 2.1 moles per mole of $MgCl_2$. Then, 25 g of the adduct thus obtained are transferred to a reactor equipped with agitator and containing 625 ml of $TiCl_4$, at 0° C., under agitation, heating it to 100° C. over a period of one hour. When the temperature reaches 40° C. a quanitity of diisobutyl phthalate is added to bring the magnesium/phthalate molar ratio to 8.

The mixture is heated to 100° C. for two hours, with agitation, and then the solid is allowed to settle. The hot liquid is syphoned out. 550 ml of $TiCl_4$ is then added and the mixture is heated to 120° C. for one hour with agitation, then the solid allowed to settle. The liquid is syphoned out, and the solid is washed 6 times with 200 ml of n-hexane at 60° C. each time, and then three times at ambient temperature.

Polymerization

The polymerization is carried out continuously in a series of reactors equipped with devices for the transfer of the product coming from the reactor immediately preceding to the one immediately following.

In gas phase the hydrogen and the monomer are analyzed continuously and fed in such a manner that the desired concentrations will be maintained constant.

A mixture of triethylaluminum (TEAL) activator and dicyclopentyldimethoxy silane (the TEAL/silane weight ratio is shown in Table A) is contacted with the solid catalyst component prepared above in a container at 40° C. for 13 minutes, in such a way that the TEAL/Ti molar ratio is 80.

The catalyst is then transferred to a reactor containing an excess of liquid propylene, and prepolymerized at 20° C. for a period ranging from 1.5 to 2 minutes.

The prepolymer is then transferred in another reactor where the polymerization occurs in gas phase to form fraction (A).

The product of the above reactor is fed to the second reactor in gas phase and eventually the product of the second reactor is fed into a third reactor in gas phase to form fraction (B).

The relative operating conditions for the preparation of and physical properties of the particular broad molecular weight distribution polypropylene (BMWD-PP) used in the compositions of the examples of the present invention are shown below in Table A.

TABLE A

| | BMWD-PP | | | | |
|---|---|---|---|---|---|
| | −1 | −2 | −3 | −4 | −5 |
| TEAL/Silane (weight) | 4.8 | 2.8 | 2.6 | 6.4 | 2.0 |
| FIRST REACTOR IN GAS PHASE | | | | | |
| Temperature, °C. | 70 | 80 | 80 | 70 | 80 |
| Pressure, atm | 24 | 24 | 24 | 24 | 22 |
| Residence time, min | 47.2 | 38.5 | 53.6 | 35.3 | 60 |
| $H_2/C_3$ (mol) | — | — | — | 0.268 | 0.20 |
| SECOND REACTOR IN GAS PHASE | | | | | |
| Temperature, °C. | 80 | 80 | 80 | 55 | 80 |
| Pressure, atm | 24 | 24 | 24 | 16 | 18 |
| Residence time, min | 47.8 | 65.1 | 65.5 | 20.5 | 95 |
| $H_2/C_3$ (mol) | 0.113 | 0.080 | 0.299 | 0.204 | 0.147 |
| $C_2/C_2 + C_3$ (mol) | — | — | — | 0.450 | — |
| THIRD REACTOR IN GAS PHASE | | | | | |
| Temperature, °C. | 80 | 80 | 80 | 55 | — |
| Pressure, atm | 24 | 24 | 24 | 16 | — |
| Residence time, min | 46.0 | 46.2 | 51.3 | 35.9 | — |
| $H_2/C_3$ (mol) | 0.491 | 0.199 | 0.491 | 0.210 | — |
| $C_2/C_2 + C_3$ (mol) | — | — | — | 0.450 | — |

TABLE B

| | BMWD-PP | | | | |
|---|---|---|---|---|---|
| | −1 | −2 | −3 | −4 | −5 |
| FIRST REACTOR IN GAS PHASE | | | | | |
| MFR, g/10 min. | — | — | — | 47.6 | 0.20 |
| [η], dl/g | 5.75 | 5.8 | 4.8 | 0.64 | 3.20 |
| Polymer produced, % wt. | 23.80 | 16.00 | 43.20 | 43.8 | 35.9 |
| SECOND REACTOR IN GAS PHASE | | | | | |
| MFR, g/10 min. | 13.93 | 2.59 | 2.75 | 42 | 7.1 |
| [η], dl/g | 1.75 | 2.47 | 2.35 | 1.56 | — |
| Xylene insoluble, % | — | — | — | — | 98.6 |
| Mw/Mn | — | — | — | — | 13 |
| Polymer, % wt of total polymer produced | 60.20 | 61.10 | 33.10 | 26.2 | 64.1 |
| THIRD REACTOR IN GAS PHASE FINAL PRODUCT | | | | | |
| MFR, g/10 min. | 32.1 | 3.5 | 3.1 | 10 | — |
| [η], dl/g | 1.55 | 2.23 | 1.98 | 1.89 | — |
| Xylene insoluble, % | 96.5 | 98.2 | 98.4 | — | — |
| Mw/Mn | 23.5 | 40 | 14 | — | — |
| Polymer produced, % wt. | 16.00 | 25.10 | 23.70 | 30.00 | — |

EXAMPLES 1 to 5 and COMPARATIVE EXAMPLES 1 and 2

The compositions of this invention are produced by a general procedure comprising tumble blending a graft copolymer of propylene polymer material, a broad molecular weight distribution polypropylene, an ethylene-propylene copolymer rubber and a hydrogenated product of a monoalkenyl aromatic hydrocarbon-conjugated diene block copolymer as set forth in Table 1, and a stabilizing package consisting of 0.5 pph calcium stearate, 0.075 pph Irganox 1010 stabilizer and 0.075 pph Sandostab P-EPQ stabilizer, until a homogeneous mixture is obtained, approximately 1 minute. The mixture is extruded at 475° F. and 350 rpm at 32.5 lb/hr in a vacuum vented, tapered, co-rotating, intermeshing 30 mm twin screw extruder manufactured by Leistritz. The compounded mixture is injection molded in a 1.5 ounce, 25 ton Battenfeld injection molding maching with a barrel temperature of 475° F. and a mold temperature of 135° F. The molding cycle for the tensile and flex bars consists of a 10 second injection time, 20 second cooling time and 2 second mold open time with a maximum injection speed (15 setting) and screw speed setting of 2.

Comparative examples 1 and 2 were prepared using the ingredients set forth in Table 1, according to the procedure described above.

TABLE 1

|  | EXAMPLES | | | | | | |
|---|---|---|---|---|---|---|---|
|  | 1 | 2 | 3 | 4 | 5 | COMP. 1 | COMP. 2 |
| PP-g-PS[1] | 75 | 60 | 42.5 | 25 | 10 | 85 | — |
| BMWD-PP-2[2] | 10 | 25 | 42.5 | 60 | 75 | — | 85 |
| Dutral C0059[3] | 7.5 | 7.5 | 7.5 | 7.5 | 7.5 | 7.5 | 7.5 |
| Kraton G-1652[4] | 7.5 | 7.5 | 7.5 | 7.5 | 7.5 | 7.5 | 7.5 |
| Flex Mod., kpsi | 210 | 205 | 211 | 206 | 234 | 210 | 233 |
| N. Izod @ 23° C., ft-lb/in | 6.9 | 13.0 | 14.3 | 15.0 | 14.4 | 5.9 | 2.4 |

[1] Homopolymer polypropylene (spherical form, 5.8 MFR, 0.35 cc/g porosity, 93.8% insoluble in xylene at R.T., Mw/Mn = 4.8), grafted with styrene, 84 pph add level, 2.0 pph active peroxide (Lupersol PMS t-butyl peroxy 2-ethylhexanoate (Lupersol PMS t-butyl peroxy 2-ethylhexanoate, 50% in mineral spirits), grafting temp. 115° C., styrene feed rate 1.0 pph/min. over 84 min. (peroxide co-feed, 0.048 pph/min.), 30 min. hold at 115° C., drying at 135° C. for 180 min., produced by separate, co-continuous additi on method.
[2] Broad molecular weight distribution polypropylene homopolymer, spherical form, 3.5 MFR, 0.12 cc/g porosity, 98.2% insoluble in xylene at R.T., Mw/Mn = 40.
[3] Ethylene-propylene copolymer rubber having an ethylene content of 57% and intrinsic viscosity of 3.37 dl/g, from Dutral.
[4] Hydrogenated styrene/butadiene/styrene triblock copolymer having 29% styrene and 71% ethylene-butene rubber midblock, from Shell Chemical Company.

As shown in Table 1, the compositions of the present invention which contain BMWD-PP and the graft copolymer demonstrate an increase in impact strength as compared to the comparative examples containing only BMWD-PP or graft copolymer.

EXAMPLES 6 to 9

The compositions set forth in Table 2 were prepared according to the general procedure used for the compositions of examples 1 to 5, except that the ratio of the ethylene-propylene copolymer rubber to the hydrogenated monoalkenyl aromatic hydrocarbon-conjugated diene block copolymer is varied.

TABLE 2

|  | EXAMPLES | | | |
|---|---|---|---|---|
|  | 6 | 7 | 8 | 9 |
| PP-g-PS[1] | 42.5 | 42.5 | 42.5 | 42.5 |
| BMWD-PP-2[2] | 42.5 | 42.5 | 42.5 | 42.5 |
| Dutral C0059[3] | 12 | 9 | 6 | 3 |
| Kraton G-1652[4] | 3 | 6 | 9 | 12 |
| Flex Mod., kpsi | 236 | 215 | 199 | 197 |
| N. Izod @ 23° C., ft-lb/in | 7.7 | 14.1 | 14.9 | 14.2 |

[1] Homopolymer polypropylene (spherical form, 5.8 MFR, 0.35 cc/g porosity, 93.8% insoluble in xylene at R.T., Mw/Mn = 4.8), grafted with styrene, 84 pph add level, 2.0 pph active peroxide (Lupersol PMS t-butyl peroxy 2-ethylhexanoate, 50% in mineral spirits), grafting temp. 115° C., styrene feed rate 1.0 pph/min. over 84 min. (peroxide co-feed, 0.048 pph/min.), 30 min. hold at 115° C., drying at 135° C. for 180 min., produced by separate, co-continuous additi on method.
[2] Broad molecular weight distribution polypropylene homopolymer, spherical form, 3.5 MFR, 0.12 cc/g porosity, 98.2% insoluble in xylene at R.T., Mw/Mn = 40.
[3] Ethylene-propylene copolymer rubber having an ethylene content of 57% and intrinsic viscosity of 3.37 dl/g, from Dutral.
[4] Hydrogenated styrene/butadiene/styrene triblock copolymer having 29% styrene and 71% ethylene-butene rubber midblock, from Shell Chemical Company.

Table 2 demonstrates the effect of varying the ratio of EPR/Kraton rubber on the compositions of the instant invention. It can be seen that the compositions still exhibit an increase in impact with little or no loss in modulus.

EXAMPLES 10 to 12 and COMPARATIVE EXAMPLES 3 to 5

The compositions containing the ingredients set forth in Table 3 were prepared according to the general procedure of the examples 1 to 5, except that the compositions were extruded at 375 rpm and 35 lb/hr., and the barrel temperature was 450° F. when the composition was injection molded in a 5 ounce Battenfeld injection molding machine having a mold temperature of 135° F.

TABLE 3

|  | EXAMPLES | | | | | |
|---|---|---|---|---|---|---|
|  | 10 | 11 | 12 | COMP. 3 | COMP. 4 | COMP. 5 |
| PP-g-PS[1] | 28.5 | 17.1 | 11.4 | 95 | — | 11.4 |
| BMWD-PP-2[2] | 66.5 | 77.9 | 83.6 | — | 95 | — |
| Polypropylene[3] | — | — | — | — | — | 83.6 |
| Polysar 306P[4] | 2.5 | 2.5 | 2.5 | 2.5 | 2.5 | 2.5 |
| Kraton G-1652[4] | 2.5 | 2.5 | 2.5 | 2.5 | 2.5 | 2.5 |
| Flex Mod., kpsi | 327 | 319 | 310 | 327 | 276 | 238 |
| Flex Str., psi | 10520 | 9517 | 8945 | 10770 | 8260 | 7866 |
| N. Izod @ 23° C., | 2.0 | 2.0 | 2.3 | 0.4 | 1.5 | 2.7 |

TABLE 3-continued

|  | EXAMPLES | | | | | |
|---|---|---|---|---|---|---|
|  | 10 | 11 | 12 | COMP. 3 | COMP. 4 | COMP. 5 |
| ft-lb/in | | | | | | |

(1) Homopolymer polypropylene (spherical form, 14.1 MFR, 0.61 cc/g porosity, 97% insoluble in xylene at R.T., Mw/Mn = 4.8), grafted with styrene, 84 pph add level, 1.65 pph active peroxide (Lupersol PMS t-butyl peroxy 2-ethylhexanoate, 50% in mineral spirits), grafting temp. 120° C., styrene feed rate 1.0 pph/min. over 85 min. (peroxide co-feed, 0.0388 pph/min.), 30 min. hold at 120° C., drying at 140° C. for 180 min., produced by separate, co-continuous addit ion method.
(2) Broad molecular weight distribution polypropylene homopolymer, spherical form, 3.5 MFR, 0.12 cc/g porosity, 98.2% insoluble in xylene at R.T., Mw/Mn = 40.
(3) Homopolymer polypropylene, spherical form, 5.8 MFR, 0.35 cc/g porosity, 93.8% insoluble in xylene at R.T., Mw/Mn = 4.8.
(4) Ethylene-propylene copolymer rubber having an ethylene content of 57% from Polysar Corporation.
(5) Hydrogenated styrene/butadiene/styrene triblock copolymer having 29% styrene and 71% ethylene-butene rubber midblock, from Shell Chemical Company.

As shown in Table 3, the compositions of the examples of the invention which contain broad molecular weight distribution polypropylene demonstrate improved impact/stiffness as compared to the compositions of the comparative examples which contain only conventional polypropylene.

EXAMPLES 13 to 15 and COMPARATIVE EXAMPLES 6 to 10

The compositions set forth in Table 4 were prepared according to the general procedure used in the examples 10 to 12.

TABLE 4

|  | EXAMPLES | | | | | | | |
|---|---|---|---|---|---|---|---|---|
|  | 13 | 14 | 15 | COMP. 6 | COMP. 7 | COMP. 8 | COMP. 9 | COMP. 10 |
| PP-g-PS(1) | 25.5 | 15.3 | 10.2 | 85 | — | 10.2 | 10.2 | 10.2 |
| BMWD-PP-2(2) | 59.5 | 69.7 | 74.8 | — | 85 | — | — | — |
| Polypropylene(3) | — | — | — | — | — | 74.8 | — | — |
| Profax 6901(4) | — | — | — | — | — | — | 74.8 | — |
| Profax 6301(5) | — | — | — | — | — | — | — | 74.8 |
| Polysar 306P(6) | 7.5 | 7.5 | 7.5 | 7.5 | 7.5 | 7.5 | 7.5 | 7.5 |
| Kraton G-1652(7) | 7.5 | 7.5 | 7.5 | 7.5 | 7.5 | 7.5 | 7.5 | 7.5 |
| Flex Mod., kpsi | 241 | 245 | 237 | 250 | 236 | 181 | 146 | 211 |
| Flex Str., psi | 6865 | 7428 | 6862 | 7838 | 6887 | 6021 | 4790 | 6590 |
| N. Izod @ 23° C., ft-lb/in | 15.7 | 15.3 | 15 | 3 | 6.3 | 16 | 16.6 | 3.3 |

(1) Homopolymer polypropylene (spherical form, 14.1 MFR, 0.61 cc/g porosity, 97% insoluble in xylene at R.T., Mw/Mn = 4.8), grafted with styrene, 85 pph add level, 1.65 pph active peroxide (Lupersol PMS t-butyl peroxy 2-ethylhexanoate, 50% in mineral spirits), grafting temp. 120° C., styrene feed rate 1.0 pph/min. over 85 min. (peroxide co-feed, 0.0388 pph/min.), 30 min. hold at 120° C., drying at 140° C. for 180 min., produced by separate, co-continuous addit ion method.
(2) Broad molecular weight distribution polypropylene homopolymer, spherical form, 3.5 MFR, 0.12 cc/g porosity, 98.2% insoluble in xylene at R.T., Mw/Mn = 40.
(3) Homopolymer polypropylene, spherical form, 5.8 MFR, 0.35 cc/g porosity, 93.8% insoluble in xylene at R.T., Mw/Mn = 4.8.
(4) Polypropylene homopolymer, 0.2 MFR, 96% insoluble in xylene at R.T., Mw/Mn = 6.5, commercially available from HIMONT U.S.A., Inc.
(5) Polypropylene homopolymer, 12 MFR, 96% insoluble in xylene at R.T., Mw/Mn = 6.5, commercially available from HIMONT U.S.A., Inc.
(6) Ethylene-propylene copolymer rubber having an ethylene content of 57%, from Polysar Corporation.
(7) Hydrogenated styrene/butadiene/styrene triblock copolymer having 29% styrene and 71% ethylene-butene rubber midblock, from Shell Chemical Company.

In Table 4, the compositions of comparative examples 8 to 10 which contain the graft copolymer, conventional polypropylene, EPR and Kraton demonstrate improved impact as compared to comparative examples 6 and 7 which do not contain polypropylene, however, there is a substantial loss in modulus. Whereas, the compositions of the present invention demonstrate an increase in impact and substantial retention of modulus.

EXAMPLES 16 to 19 and COMPARATIVE EXAMPLES 11

The compositions set forth in Table 5 were prepared according to the general procedure of the examples in Table 3, except that the melt temperature during extrusion was 445° F. and the stabilizer package was 0.25 pph DSTDP, 0.1 pph Irganox 1010 and 0.08 pph PEP-Q.

TABLE 5

|  | EXAMPLES | | | | |
|---|---|---|---|---|---|
|  | 16 | 17 | 18 | 19 | COMP. 11 |
| PP-g-PS(1) | 43.5 | 30.5 | 21.5 | 13 | 87 |
| BMWD-PP-2(2) | 43.5 | 56.5 | 65.5 | 74 | — |
| Polysar 306P(3) | 6.5 | 6.5 | 6.5 | 6.5 | 6.5 |
| Kraton G-1652(4) | 6.5 | 6.5 | 6.5 | 6.5 | 6.5 |
| Flex Mod., kpsi | 228 | 239 | 229 | 237 | 226 |
| N. Izod @ 23° C., ft-lb/in | 11.2 | 12.3 | 12.6 | 11.8 | 3.2 |

(1) Homopolymer polypropylene (spherical form, 9.1 MFR, 0.53 cc/g porosity, 97.8% insoluble in xylene at R.T., Mw/Mn = 4.5), grafted with styrene, 52 pph add level, 1.05 pph active peroxide (Lupersol PMS t-butyl peroxy 2-ethylhexanoate, 50% in mineral spirits), grafting temp. 120° C., styrene feed rate 1.0 pph/min. over 52 min. (peroxide co-feed, 0.040 pph/min.), 30 min. hold at 120° C., drying at 140° C. for 180 min., produced by separate, co-continuous addit ion method.
(2) Broad molecular weight distribution polypropylene homopolymer, spherical form, 3.5 MFR, 0.12 cc/g porosity, 98.2% insoluble in xylene at R.T., Mw/Mn = 40.
(3) Ethylene-propylene copolymer rubber having an ethylene content of 57%, from Polysar Corporation.
(4) Hydrogenated styrene/butadiene/styrene triblock copolymer having 29% styrene and 71% ethylene-butene rubber midblock, from Shell Chemical Company.

In Table 5, it can be seen that lower amounts of the graft copolymer can be used and and still obtain compositions having improved impact/stiffness.

EXAMPLES 20 to 23 and COMPARATIVE EXAMPLES 12 to 16

The compositions set forth in Table 6 were prepared according to the general procedure used for the compositions in Table 3, except that a different broad molecular weight distribution polypropylene was used.

TABLE 6

| | EXAMPLES | | | | | | | | |
|---|---|---|---|---|---|---|---|---|---|
| | 20 | 21 | 22 | 23 | COMP. 12 | COMP. 13 | COMP. 14 | COMP. 15 | COMP. 16 |
| PP-g-PS[1] | 40 | 37.5 | 24 | 22.5 | 80 | 75 | — | — | — |
| BMWD-PP-3[3] | 40 | 37.5 | 56 | 52.5 | — | — | 80 | 75 | — |
| Profax 8501[3] | — | — | — | — | — | — | — | — | 100 |
| Polysar 306P[4] | 10 | 12.5 | 10 | 12.5 | 10 | 12.5 | 10 | 12.5 | — |
| Kraton G-1652[5] | 10 | 12.5 | 10 | 12.5 | 10 | 12.5 | 10 | 12.5 | — |
| Flex Mod., kpsi | 210 | 181 | 214 | 188 | 214 | 174 | 224 | 200 | 140 |
| Flex Str., psi | 5448 | 4521 | 5676 | 4588 | 5669 | 4587 | 6075 | 5284 | 4568 |
| N. Izod, ft-lb/in @ 23° C. | 13.7 | 14.5 | 15.5 | 14.6 | 9.8 | 11.5 | 5.6 | 10.1 | 8.3 |
| 0° C. | 8.2 | 14.2 | 9.3 | 13.3 | 3.8 | 10.7 | 1.3 | 2.5 | 2 |
| −18° C. | 2.1 | 11 | 1.9 | 9.2 | 1.7 | 3.4 | — | — | 1.4 |
| −29° C. | 1.4 | 2.2 | 1.2 | 2 | — | 1.7 | — | — | — |

[1] Homopolymer polypropylene (spherical form, 14.1 MFR, 0.61 cc/g porosity, 97% insoluble in xylene at R.T., Mw/Mn = 4.8), grafted with styrene, 85 pph add level, 1.65 pph active peroxide (Lupersol PMS t-butyl peroxy 2-ethylhexanoate, 50% in mineral spirits), grafting temp. 120° C., styrene feed rate 1.0 pph/min. over 85 min. (peroxide co-feed, 0.0388 pph/min.), 30 min. hold at 120° C., drying at 140° C. for 180 min., produced by separate, co-continuous addition method.
[2] Broad molecular weight distribution polypropylene homopolymer, spherical form, 3.1 MFR, 0.13 cc/g porosity, 98.4% insoluble in xylene at R.T., Mw/Mn = 14.
[3] High impact ethylene-propylene rubber impact modified polypropylene homopolymer having an ethylene content of 25%, commercially available from HIMONT U.S.A., Inc.
[4] Ethylene-propylene copolymer rubber having an ethylene content of 57%, from Polysar Corporation.
[5] Hydrogenated styrene/butadiene/styrene triblock copolymer having 29% styrene and 71% ethylene-butene rubber midblock, from Shell Chemical Company.

The compositions in Table 6 demonstrate the low temperature impact performance of the compositions of the present invention as compared to compositions containing styrene grafted polypropylene or broad molecular weight distribution polypropylene and rubber; and high impact ethylene-propylene rubber impact modified polypropylene alone

EXAMPLES 24 to 27

The compositions set forth in Table 7 were prepared according to the general procedure used for the compositions of Table 1, except that in example 26 a heterophasic BMWD-PP was used instead of an ethylenepropylene copolymer rubber, and in example 27 a styrene/butadiene/styrene type block copolymer was used instead of a hydrogenated styrene/butadiene/styrene type block copolymer.

TABLE 7

| | EXAMPLES | | | |
|---|---|---|---|---|
| | 24 | 25 | 26 | 27 |
| PP-g-PS[1] | 22.5 | 25.5 | 25.5 | 25.5 |
| BMWD-PP-1[2] | 52.5 | — | — | — |
| BMWD-PP-3[3] | — | — | 53.4 | 59.5 |
| BMWD-PP-5[4] | — | 59.5 | — | — |
| BMWD-PP-4 | — | — | 13.6 | — |
| Ethylene-propylene copolymer rubber impact modified[5] | | | | |
| Polysar 306P[6] | 12.5 | 7.5 | — | 7.5 |
| Kraton G-1652[7] | 12.5 | 7.5 | 7.5 | — |
| Kraton D-1101[8] | — | — | — | 7.5 |
| Flex Mod., kpsi | 188 | 230 | 240 | 280 |
| Flex Str., psi | 5195 | 6555 | 6877 | 7695 |
| N. Izod @ 23° C., | 13 | 14 | 7 | 3.4 |

TABLE 7-continued

| | EXAMPLES | | | |
|---|---|---|---|---|
| | 24 | 25 | 26 | 27 |
| ft-lb/in | | | | |

[1] Homopolymer polypropylene (spherical form, 14.1 MFR, 0.61 cc/g porosity, 97% insoluble in xylene at R.T., Mw/Mn = 4.8), grafted with styrene, 85 pph add level, 1.65 pph active peroxide (Lupersol PMS t-butyl peroxy 2-ethylhexanoate, 50% in mineral spirits), grafting temp. 120° C., styrene feed rate 1.0 pph/min. over 85 min. (peroxide co-feed, 0.039 pph/min.), 30 min. hold at 120° C., drying at 140° C. for 180 min., produced by separate, co-continuous addition method.
[2] Broad molecular weight distribution polypropylene homopolymer, spherical form, 32.1 MFR, 0.11 cc/g porosity, 96.5% insoluble in xylene at R.T., Mw/Mn = 23.5.
[3] Broad molecular weight distribution polypropylene homopolymer, spherical form, 3.1 MFR, 0.13 cc/g porosity, 98.4% insoluble in xylene at R.T., Mw/Mn = 14.
[4] Broad molecular weight distribution polypropylene homopolymer, spherical form, 7.1 MFR, 0.38 cc/g porosity, 98.6% insoluble in xylene at R.T., Mw/Mn = 13.
[5] Ethylene-propylene rubber impact modified broad molecular weight distribution polypropylene homopolymer having an ethylene-propylene rubber content of 60%, 10 MFR, $C_2/C_3$ in EPR = 65/35, spherical form.
[6] Ethylene-propylene copolymer rubber having an ethylene content of 57%, from Polysar Corporation.
[7] Hydrogenated styrene/butadiene/styrene triblock copolymer having 29% styrene and 71% ethylene-butene rubber midblock, from Shell Chemical Company.
[8] Styrene/butadiene/styrene triblock copolymer rubber having 31% styrene and 69% butadiene rubber midblock, from Shell Chemical Company.

EXAMPLES 28 and 29

The compositions set forth in Table 8 were prepared according to the general procedure used for the compositions of Table 7 except that the graft copolymer, Kraton G-1652 rubber, Polysar 306P EPR and stabilizing package were dry blended and extruded on the Leistritz at 375 rpm, 35 lbs/hr and 445° F. melt and pelletized. The pelletized product was then dry blended with the BMWD-PP component and extruded on the Leistritz at 375 rpm, 35 lbs/hr, 445° F. The compounded mixture was injection molded on a 5 ounce Battenfeld injection molding machine with a barrel temperature of 450° F. and mold temperature of 135° F.

TABLE 8

| | EXAMPLES | |
|---|---|---|
| | 28 | 29 |
| PP-g-PS[1] | 24 | — |
| PP-g-PS[2] | — | 24 |
| BMWD-PP-1[3] | 56 | 56 |
| Polysar 306P | 10 | 10 |

TABLE 8-continued

| | EXAMPLES | |
|---|---|---|
| | 28 | 29 |
| Kraton G-1652 | 10 | 10 |
| Flex Mod., kpsi | 213 | 208 |
| Flex. Str., psi | 6040 | 5890 |
| N. Izod @ 23° C., ft-lb/in | 10.5 | 11.1 |

(1)See footnote 1 in Table 7.
(2)Homopolymer polypropylene (spherical form, 24.6 MFR, 0.51 cc/g porosity, 98% insoluble in xylene at R.T., Mw/Mn = 6.5), grafted with styrene, 85 pph add level, 1.65 pph active peroxide (Lupersol PMS t-butyl peroxy 2-ethylhexanoate) grafting temp. 121° C., styrene feed rate 0.9 pph/min over 94.4 min (peroxide co-feed, 0.035 pph/min), 30 min hold at 121° C., drying at 140° C. for 180 min, produced by separate co-continuous addition method.
(3)See footnote 2 in Table 7.

EXAMPLES 30 to 32

The compositions set forth in Table 9 were prepared according to the general procedure used for the compositions in Table 3, except that the rubber component was a graft copolymer of butyl acrylate on a polypropylene backbone instead of Polysar 306P and Kraton G-1652 and a stabilizer package of 0.25 pph DSTDP, 0.07 pph Irganox 1010 and 0.07 pph of PEP-Q were used, and the compositions were extruded at 475° F. and 100 rpm in a vacuum vented, tapered, counter-rotating, intermeshing twin screw extruder manufactured by Haake, and the barrel temperature of the injection molding was 450° F. in a 1.5 ounce Battenfeld injection molding machine.

TABLE 9

| | EXAMPLES | | |
|---|---|---|---|
| | 30 | 31 | 32 |
| PP-g-PS(1) | 36.5 | 26 | 6 |
| PP-g-BA(2) | 48 | 48 | 48 |
| BMWD-PP(3) | 15.5 | 26 | 46 |
| Flex Mod., kpsi | 259 | 262 | 266 |
| Flex Strength, psi | 7800 | 7753 | 7770 |
| N. Izod @ 23° C., ft-lb/in | 2.8 | 3.0 | 4.3 |

(1)Homopolymer polypropylene (spherical form, 5.8 MFR, 0.35 cc/g porosity, 93.8% insoluble in xylene at R.T., Mw/Mn = 4.8), grafted with styrene, 85 pph styrene, 2.0 pph active peroxide (Lupersol PMS t-butyl peroxy 2-ethylhexanoate, 50% in mineral spirits), grafting temp. 121° C., styrene feed rate 0.9 pph/min. over 90 min. (peroxide co-feed, 0.0444 pph/min.), 30 min. hold at 121° C., drying at 135° C. for 190 min, produced by separate, co-continuous additio n method.
(2)Homopolymer polypropylene (spherical form, 4.8 MFR, 0.35 cc/g porosity) grafted with butyl acrylate, 30.5% butyl acrylate, 0.5 pph active peroxide (Lupersol 11 t-butyl peroxypivalate, 75% in mineral spirits), grafting temp. 80° C., butyl acrylate feed 44 pph, feed rate 1.0 ppm/min over 44 min., deactivation at 120° C. for 30 min., produced by the separate, sequential addition of peroxide and monomer polymerization method.
(3)Broad molecular weight distribution polypropylene homopolymer, spherical form, 3.5 MFR, 0.12 cc/g porosity, 98.2% insoluble in xylene at R.T., Mw/Mn = 40.

EXAMPLES 33 to 39

The compositions of Table 10 were prepared according to the examples of Table 5, except that a styrene/acrylonitrile grafted polypropylene was used instead of styrene grafted polypropylene, and in examples 36 thru 39 a hydrogenated block copolymer and broad molecular weight distribution polypropylene masterbatch, Kraton G-1652/BMWD-PP, was used instead of a hydrogenated block copolymer with an ethylene-propylene copolymer rubber; and in examples 34 and 36 to 39 a stabilizing package containing 0.07% PEP-Q, 0.1% Irganox 1010 and 0.5% calcium stearate, and in examples 33 and 35 a stabilizing package of 0.075 pph PEP-Q, 0.075 Irganox 1010 and 0.5 pph calcium stearate was used.

The Kraton G-1652/BMWD-PP masterbatch was prepared by charging to a 3 lb. Banbury mixer, 50% Kraton G, 50% BMWD-PP and stabilizing package set forth above. Melt blending the components for 4 minutes at 340° F. Using a two-roll mill, the mixture was pressed into a sheet and cut into strips. The strips were ground into crumbs in a Cumberland grinder with a ⅜" screen and then flood fed to the hopper of a Haake System 90 counter-rotating, fully intermeshing twin screw extruder and extruded at 175 rpm using a ramped barrel temperature profile of 475°–575° F. The extrudate was pelletized and then compounded with the other ingredients set forth below in the Table according to the general procedure in Table 5.

TABLE 10

| | EXAMPLES | | | | | | |
|---|---|---|---|---|---|---|---|
| | 33 | 34 | 35 | 36 | 37 | 38 | 39 |
| PP-g-PSAN(1) | 42.5 | — | 25.5 | — | — | — | — |
| PP-g-PSAN(2) | — | 41 | — | 44 | 42.5 | 42.5 | 42.5 |
| BMWD-PP-3(3) | 42.5 | — | 59.5 | — | — | — | — |
| BMWD-PP-2(4) | — | 41 | — | 41.5 | 40 | 36.5 | 37.5 |
| Polysar G-1652P(5) | 15 | 18 | 15 | 9.5 | 12.5 | 9 | 10 |
| Kraton G-1652/ BMWD-PP(6) | — | — | — | 5 | 5 | 12 | 10 |
| Flex Mod., kpsi | 265 | 230 | 267 | 240 | 219 | 226 | 231 |
| Flex Str., psi | 7210 | 6375 | 7215 | 7080 | 6436 | 6720 | 6747 |
| N. Izod @ 23° C., | 2 | 3.5 | 2.5 | 2.6 | 3.5 | 3.8 | 3.6 |

TABLE 10-continued

|  | EXAMPLES | | | | | | |
|---|---|---|---|---|---|---|---|
|  | 33 | 34 | 35 | 36 | 37 | 38 | 39 |
| ft-lb/in | | | | | | | |

[1]Homopolymer polypropylene (spherical form, 14.1 MFR, 0.61 cc/g porosity, 97% insoluble in xylene at R.T., Mw/Mn = 4.8), grafted with styrene/acrylonitrile (SAN) (3:1 wt. ratio), 85 pph add level, 1.07 pph active peroxide (Lupersol 11 t-butyl peroxypivalate, in 75% mineral spirits), grafting temp. 90° C., SAN feed rate 1 pph/min. over 85 min. (peroxide co-feed, 0.0126 pph/min), 30 min. hold at 90° C., drying at 140° C. for 120 min, produced by separate, co- continuous addition method.
[2]Homopolymer polypropylene (spherical form, 5.8 MFR, 0.35 cc/g porosity, 93.8% insoluble in xylene at R.T., Mw/Mn = 4.8), grafted with styrene/acrylonitrile (SAN) (3:1 wt. ratio), 85 pph add level, 1.6 pph active peroxide (Lupersol 11 t-butyl peroxypivalate, in 75% mineral spirits), grafting temp. 90° C., SAN feed rate 0.5 pph/min. over 170 min. (peroxide co-feed, 0.0094 pph/min), 30 min. hold at 90° C., drying at 140° C. for 120 min., produced by separate, co-continuous addition method.
[3]Broad molecular weight distribution polypropylene homopolymer, spherical form, 3.1 MFR, 0.13 cc/g porosity, 98.4% insoluble in xylene at R.T., Mw/Mn = 14.
[4]Broad molecular weight distribution polypropylene homopolymer, spherical form, 3.5 MFR, 0.12 cc/g porosity, 98.2% insoluble in xylene at R.T., Mw/Mn = 40.
[5]Ethylene-propylene copolymer rubber having an ethylene content of 57%, produced by Polysar Corporation.
[6]A 50:50 blend of a hydrogenated styrene/butadiene/styrene triblock copolymer having 29% styrene and 71% ethylene-butene rubber midblock, produced by Shell Chemical Company, and Broad molecular weight distribution polypropylene homopolymer, spherical form, 3.5 MFR, 0.12 cc/g porosity, 98.2% insoluble in xylene at R.T., Mw/Mn = 40.

EXAMPLES 40 to 42

The compositions of Table 11 were prepared according to the procedure used for the compositions in Table 3, except that instead of styrene grafted polypropylene, styrene/methyl methacrylate/acrylonitrile grafted on polypropylene, styrene/methyl methacrylate grafted on polypropylene or methyl methacrylate grafted on polypropylene was used and a melt extrusion temperature of 445° F.

TABLE 11

|  | EXAMPLES | | |
|---|---|---|---|
|  | 40 | 41 | 42 |
| PP-g-PS/MMA/AN[1] | 25.5 | — | — |
| PP-g-PS/MMA[2] | — | 25.5 | — |
| PP-g-PMMA[3] | — | — | 25.5 |
| BMWD-PP-3[4] | 59.5 | 59.5 | 59.5 |
| Polysar 306P[5] | 15 | 7.5 | 7.5 |
| Kraton G-1652[6] | — | 7.5 | 7.5 |
| Flex Mod., kpsi | 252 | 233 | 247 |
| Flex Str., psi | 7174 | 6785 | 7063 |
| N. Izod @ 23° C., ft-lb/in | 2.4 | 4.1 | 12.1 |

[1]Homopolymer polypropylene (spherical form, 14.1 MFR, 0.61 cc/g porosity, 97% insoluble in xylene at R.T., Mw/Mn = 4.8), grafted with styrene/methyl methacrylate/acrylonitrile (PS/MMA/AN) (3.73:1:1 wt. ratio), 70 pph add level (45.5 pph styrene, 12.3 pph MMA, 12.2 pph AN), 1.1 pph active peroxide (Lupersol 11 t-butyl peroxypivalate, 75% in mineral spirits), grafting temp. 90° C., PS/MMA-/AN feed rate 1.0 pph/min over 70 min. (peroxide co-feed, 0.0157 pph/min), 30 m in. hold at 90° C., drying at 140° C. for 30 min., produced by co-continuous addition method.
[2]Homopolymer polypropylene (spherical form, 14.1 MFR, 0.61 cc/g porosity, 97% insoluble in xylene at R.T., Mw/Mn = 4.8), grafted with styrene/methyl methacrylate (PS/MMA) (1:1.5 wt. ratio), 70 pph add level (28 pph styrene, 42 pph MMA), 1.24 pph active peroxide (Lupersol 11 t-butyl peroxypivalate, 75% in mineral spirits), grafting temp. 100° C., PS/MMA feed rate 1.0 pph/min. over 70 min. (peroxide co-feed, 0.018 pph/min), 30 min hold at 90° C., drying at 140 0° C. for 120 min., produced by separate, co-continuous addition method.
[3]Homopolymer polypropylene (spherical form, 9.1 MFR, 0.53 cc/g porosity, 97.8% insoluble in xylene at R.T., Mw/Mn = 4.5), grafted with methyl methacrylate/styrene (13:1 wt. ratio), 70 pph add level (65 pph MMA, 5 pph styrene), 1.26 pph active peroxide (Lupersol PMS t-butyl peroxy 2-ethylhexanoate, 50% in mineral spirits), grafting temp. 115° C., MMA/PS feed rate 1.0 pph/min over 70 min. (peroxide co-feed, 0.018 pph/min), 30 min hold at 115° C., drying at 140 ° for 120 min., produced by separate, co-continuous addition method.
[4]Broad molecular weight distribution polypropylene homopolymer, spherical form, 3.1 MFR, 0.13 cc/g porosity, 98.4% insoluble in xylene at R.T., Mw/Mn = 14.
[5]Ethylene-propylene copolymer rubber having an ethylene content of 57%, from Polysar Corporation.
[6]Hydrogenated styrene/butadiene/styrene triblock copolymer having 29% styrene and 71% ethylene-butene rubber midblock, from Shell Chemical Company.

EXAMPLES 43–44

These examples illustrate the preparation of compositions of this invention with filler materials.

The ingredients set forth in Table 12 for these examples are mixed in a Henschel mixer until a homogeneous mixture is obtained (approx. 1 minute). The resulting mixture is then compounded on a 30 mm Leistritz co-rotating twin screw extruder using a batch type feed scheme at a 350 rpm screw speed, a 30–35 lb/hr feed rate and a 230 degree C. (flat) temperature profile. Upon extrusion, the extrudate is pelletized in a conventional manner.

The comparative examples 17 to 21 were prepared in the same manner except that the Pro-fax products of comparative examples 20 and 21 are commercially available products in pellet form. Hence, these products were already compounded with the calcium stearate, Irganox 1010 stabilizer and Supercoat calcium carbonate in the amounts reported in Table 12.

The compounded products of the examples and of the comparatives are injection molded on a 5 oz, 75 ton Battenfeld injection molding machine set at 475 degrees F. and at a mold temperature of 100 degrees F.

TABLE 12

|  | EXAMPLES | | | | | | |
|---|---|---|---|---|---|---|---|
|  | 43 | 44 | Comp. 17 | Comp. 18 | Comp. 19 | Comp. 20 | Comp. 21 |
| PP-g-PS[1] | 8.20 | 6.10 | | | | | |

TABLE 12-continued

|  | EXAMPLES |  |  |  |  |  |  |
|---|---|---|---|---|---|---|---|
|  | 43 | 44 | Comp. 17 | Comp. 18 | Comp. 19 | Comp. 20 | Comp. 21 |
| BMWD-PP-3[2] | 59.80 | 44.90 |  |  |  |  |  |
| PP-g-PS[3] |  |  | 76.50 | 68.00 | 59.50 |  |  |
| Pro-fax 73A6-2[4] |  |  |  |  |  | 100.00 |  |
| Pro-fax 73A6-4[5] |  |  |  |  |  |  | 100.00 |
| Kraton G 1652[6] | 6.00 | 4.50 | 6.75 | 6.00 | 5.25 |  |  |
| Polysar 306P EPR[7] | 6.00 | 4.50 | 6.75 | 6.00 | 5.25 |  |  |
| Calcium Stearate | 0.10 pph | 0.10 pph | — | — | — | 0.10 pph | 0.10 pph |
| Irganox 1010 Stabilizer | 0.10 pph | 0.10 pph | 0.07 pph | 0.07 pph | 0.07 pph | 0.37 pph | 0.37 pph |
| PEP-Q Stabilizer | 0.08 pph | 0.08 pph | 0.07 pph | 0.07 pph | 0.07 pph | — | — |
| DSTDP | 0.25 pph | 0.25 pph | 0.25 pph | 0.25 pph | 0.25 pph | — | — |
| CaCO3 Supercoat | 20 | 40 | 10 | 20 | 30 | 20 | 40 |
| Flexural Modulus (kpsi) | 354 | 408 | 249 | 270 | 301 | 201 | 294 |
| Flexural Strength (psi) | 7404 | 7165 | 6503 | 6471 | 6443 | 5300 | 5300 |
| Notched Izod (ft-lb/in) | 3.1 | 2.6 | 2.5 | 2.5 | 2 | 2 | 1.8 |

[1] Homopolymer polypropylene (spherical form, 9.1 MFR, 0.53 cc/g porosity, 97.8% insoluble in xylene at R.T., Mw/Mn = 4.5), grafted with styrene, 85 pph add level, 1.65 pph active peroxide (Lupersol PMS t-butyl peroxy 2-ethylhexanoate, 50% in mineral spirits), grafting temp. 120° C., styrene feed rate 1.0 pph/min. over 85 min. (peroxide co-feed, 0.039 pph/min.), 30 min. hold at 120° C., drying at 140° C. for 180 min., produced by separate, co-continuous addit ion method.
[2] See footnote 2 in Table 6.
[3] See footnote 1 in Table 1.
[4] Profax 73A6-2: 20% Supercoat CaCO3 filled EPR impact modified polypropylene commercially available from HIMONT U.S.A., Inc.
[5] Profax 73A6-4: 40% Supercoat CaCO3 filled EPR impact modified polypropylene commercially available from HIMONT U.S.A., Inc.
[6] See footnote 4 in Table 1.
[7] See footnote 4 in Table 3.

The above Table shows that the filled compositions of this invention have improved impact strength and flexural modulus and strength values over commercial impact modified polypropylene and over styrene-grafted-polypropylene without the BMWD polypropylene.

EXAMPLES 45-49

The ingredients set forth in Table 13 for these examples except the filler are mixed in a large tumble blender until a homogeneous mixture is obtained (approx. 10 min.). The resulting mixture is then compounded on a 40 mm Werner & Pfleider ZSK co-rotating twin screw extruder using a downstream filler addition scheme utilizing a loss-in-weight feeder at a 400 rpm screw speed, a 200 lb/hr feed rate and a 260 degree C. (flat) temperature profile. Upon extrusion, the extrudate is pelletized in a conventional manner.

The comparative example 22 is prepared in the same manner as examples 45-49. The Pro-fax products of comparative examples 23 and 24 are commercially available products in pellet form. Hence, these products were already compounded with the calcium stearate, Irganox 1010 stabilizer and Supercoat calcium carbonate in the amounts reported in Table 13.

The compounded products of the examples and of the comparatives are injection molded in the same manner as for the products of Table 12. All plate impact tests are performed on 5"×5" plaques using a Rheometrics RIT 8000 high rate impact tester, with a 3" backup plate and a ½" diameter dart. The impact rate is set at 2.2 m/s (5 mi/hr).

TABLE 13

|  | EXAMPLES |  |  |  |  |  |  |  |
|---|---|---|---|---|---|---|---|---|
|  | 45 | 46 | 47 | 48 | 49 | Comp. 22 | Comp. 23 | Comp. 24 |
| PP-g-PS[1] | 9.20 | 8.20 | 7.10 | 6.10 | 5.10 |  |  |  |
| BMWD-PP-3[2] | 67.30 | 59.80 | 52.40 | 44.90 | 37.40 |  |  |  |
| PP-g-PS[3] |  |  |  |  |  | 59.50 |  |  |
| Pro-fax 73A6-2[4] |  |  |  |  |  |  | 100.00 |  |
| Pro-fax 73A6-4[5] |  |  |  |  |  |  |  | 100.00 |
| Kraton G 1652[6] | 6.75 | 6.00 | 5.25 | 4.50 | 3.75 | 5.25 |  |  |
| Polysar 306P EPR[7] | 6.75 | 6.00 | 5.25 | 4.50 | 3.75 | 5.25 |  |  |
| Calcium Stearate | 0.10 pph | 0.10 pph | 0.10 pph | 0.10 pph | 0.10 pph |  | 0.10 pph | 0.10 pph |
| Irganox 1010 Stabilizer | 0.10 pph | 0.10 pph | 0.10 pph | 0.10 pph | 0.10 pph | 0.10 pph | 0.37 pph | 0.37 pph |
| PEP-Q Stabilizer | 0.08 pph | 0.08 pph | 0.08 pph | 0.08 pph | 0.08 pph | 0.08 pph |  |  |
| DSTDP | 0.25 pph | 0.25 pph | 0.25 pph | 0.25 pph | 0.25 pph |  |  |  |
| Supercoat CaCO3 | 10 | 20 | 30 | 40 | 50 | 30 | 20 | 40 |
| Flexural Modulus (kpsi) | 273 | 297 | 355 | 381 | 387 | 313 | 201 | 294 |
| Flexural Strength (psi) | 6861 | 7076 | 6883 | 6483 | 6192 | 6807 | 5300 | 5300 |
| Notched Izod (ft-lb/in) | 4 | 3.4 | 2.8 | 2.6 | 3.3 | 1.5 | 2 | 1.8 |
| Rheometrics | 20 | 21 | 19 | 19 | 18 | 19 | 17 | 16 |

TABLE 13-continued

| | EXAMPLES | | | | | | | |
|---|---|---|---|---|---|---|---|---|
| | 45 | 46 | 47 | 48 | 49 | Comp. 22 | Comp. 23 | Comp. 24 |
| Plate Imp. 23 C, Ft-lb | | | | | | | | |
| 0 C | 23 | 22 | 22 | 21 | 21 | | 21 | 19 |
| −18 C | 23 | 23 | 23 | | 19 | | 13 | 16 |
| −29 C | 7 | 20 | | 24 | 16 | 1 | 13 | 12 |
| −40 C | 5 | 19 | 17 | 12 | 7 | | 14 | 4 |

Footnotes for TABLE 13
(1)See footnote 1 in Table 12.
(2)See footnote 2 in Table 6.
(3)Homopolymer polypropylene (spherical form, 5.8 MFR, 0.35 cc/g porosity, 93.8% insoluble in xylene at R.T., Mw/Mn = 4.8), grafted with styrene, 85 pph add level, 1.51 pph active peroxide (Lupersol PMS t-butyl peroxy 2-ethylhexanoate, 50% in mineral spirits), grafting temp. 123° C., styrene feed rate 1.0 pph/min. over 85 min. (peroxide co-feed, 0.036 pph/min.), 30 min. hold at 123° C., drying at 135° C. for 208 min., produced by separate, co-continuous addit ion method.
(4)Profax 73A6-2: 20% Supercoat CaCO3 filled EPR impact modified polypropylene commercially available from HIMONT U.S.A., Inc.
(5)Profax 73A6-4: 40% Supercoat CaCO3 filled EPR impact modified polypropylene commercially available from HIMONT U.S.A., Inc.
(6)See footnote 4 in Table 1.
(7)See footnote 4 in Table 3.

The above data shows that the filled compositions of this invention have improved impact strength and flexural modulus and strength values over commercial impact modified polypropylene and over styrene-grafted-polypropylene without the BMWD polypropylene. In addition, the filled compositions of this invention demonstrate superior retention of biaxial plate impact at low temperature.

EXAMPLES 50-51

The ingredients set forth in Table 14 for these examples are prepared, compounded, pelletized and injection molded in the same manner as the examples 43 and 44 in Table 12.

TABLE 14

| | EXAMPLES | |
|---|---|---|
| | 50 | 51 |
| PP-g-PS(1) | 8.20 | 6.10 |
| BMWD-PP-3(2) | 59.80 | 44.90 |
| Kraton G 1652(3) | 6.00 | 4.50 |
| Polysar 306P EPR(6) | 6.00 | 4.50 |
| Calcium Stearate | 0.10 pph | 0.10 pph |
| Irganox 1010 Stabilizer | 0.10 pph | 0.10 pph |
| PEP-Q Stabilizer | 0.08 pph | 0.08 pph |
| DSTDP | 0.25 pph | 0.25 pph |
| Talc, 1.8μ(5) | 20 | 40 |
| Flexural Modulus (kpsi) | 477 | 553 |
| Notched Izod (ft-lb/in) | 1.3 | 1.0 |

(1)See footnote 1 in Table 12.
(2)See footnote 2 in Table 6.
(3)See footnote 4 in Table 1.
(4)See footnote 4 in Table 3.
(5)P-3 Talc from Nippon Talc Ltd.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:

1. An impact modified graft copolymer composition comprising, by weight:
   (A) from 10 to 90% of a graft copolymer of propylene polymer material having graft polymerized thereto one or more vinyl monomer(s);
   (B) from 90 to 10% of at least one broad molecular weight distribution propylene polymer material having a $M_w/M_n$ of 8 to 60, a melt flow rate of 0.5 to 50, and a xylene insolubles at 25° C. of greater than or equal to 94%; and
   (C) from 2 to 25% of at least one rubber component, wherein the total amount of (A)+(B)+(C) is 100%.

2. The composition of claim 1 wherein the propylene polymer material of said graft copolymer (A) is selected from the group consisting of a homopolymer of propylene, a random copolymer of propylene with ethylene or $C_{4-10}$ alpha-olefins, and a random terpolymer of propylene with two different olefins selected from ethylene and $C_{4-8}$ alpha-olefins.

3. The composition of claim 2 wherein said one or more vinyl monomer(s) is selected from styrene, methyl methacrylate, styrene/methyl acrylate, styrene/acrylonitrile and styrene/methyl methacrylate/acrylonitrile.

4. The composition of claim 1 wherein said broad molecular weight distribution propylene polymer material is a homopolymer of propylene or an ethylene-propylene rubber impact modified broad molecular weight distribution polypropylene.

5. The composition of claim 1 wherein said rubber component (C) is selected from the group consisting of (i) an olefin rubber containing two or more monomers selected from ethylene, propylene or butene, and optionally a non-conjugated diene, (ii) one or more monoalkenyl aromatic hydrocarbon-conjugated diene block copolymer or hydrogenated products thereof, (iii) a graft copolymer of propylene polymer material grafted with polymerizable monomer(s) which when polymerize form a rubbery polymer(s) having a Tg less than 20° C., and (iv) mixtures thereof.

6. The composition of claim 1 wherein (A) is a graft copolymer of styrene, styrene/methyl methacrylate or styrene/acrylonitrile on a polypropylene backbone, (B) is a broad molecular weight distribution polypropylene and (C) is an olefin rubber and a monoalkenyl aromatic hydrocarbon-conjugated diene block copolymer.

7. The composition of claim 6 wherein the olefin rubber is an ethylene-propylene rubber.

8. The composition of claim 1 wherein (A) is a graft copolymer of styrene on a polypropylene backbone, (B) is a broad molecular weight distribution polypropylene, and (C) is an olefin rubber and a hydrogenated product of a monoalkenyl aromatic hydrocarbon-conjugated diene block copolymer.

9. The composition of claim 8 wherein said olefin rubber is an ethylene-propylene rubber copolymer.

10. The composition of claim 1, wherein (A) is a graft copolymer of styrene on a polypropylene backbone, (B) is a broad molecular weight distribution polypropylene and (C) is a graft copolymer of propylene polymer material grafted with a polymerizable monomer(s) which when polymerize form a rubbery polymer(s) having a Tg less than 20° C.

11. The composition of claim 10, wherein (C) is a graft copolymer of butyl acrylate, butyl acrylate/butyl methacrylate or butyl acrylate/ethylhexyl acrylate on a propylene polymer material backbone.

12. The composition of claim 11, wherein (C) is a graft copolymer of butyl acrylate on a polypropylene backbone.

13. The composition of claim 1 which further comprises from about 10 to about 100 parts of a filler selected from the group consisting of talc, calcium carbonate, silicate and mixtures thereof per hundred parts (pph) of said composition, where said filler has a mean particle size from 0.5 to 4.0 microns.

* * * * *